United States Patent

[11] 3,625,885

[72] Inventors Anthony Geinopolos
West Allis;
Mahendra K. Gupta, West Allis; William J. Katz, Milwaukee, all of Wis.
[21] Appl. No. 143,188
[22] Filed May 13, 1971
[45] Patented Dec. 7, 1971
[73] Assignee Rex Chainbelt Inc.
Milwaukee, Wis.

[54] RECOVERY OF CHROMATES BY REVERSE OSMOSIS
3 Claims, No Drawings
[52] U.S. Cl. .................................................... 210/23
[51] Int. Cl. .................................................... B01d 13/00
[50] Field of Search ........................................... 210/23, 321

[56] References Cited
UNITED STATES PATENTS
3,528,901 9/1970 Wallace et al. ............... 210/23 X Primary Examiner—Frank A. Spear, Jr.
Attorneys—Ernst W. Schultz and Joseph J. Jochman, Jr.

ABSTRACT: Process water containing hexavalent chromium is pretreated to bring it to a state of dichromate dominance and the water is then subjected to reverse osmosis using a loose membrane. The membrane allows passage of most of the dichromate ions with the product water while concurrently effecting a significant reduction in the hardness and dissolved solids levels. The softened product water containing dichromate ions is recyclable with the recirculated process water and the wasted fraction contains substantially lower amounts of potentially harmful chromium.

RECOVERY OF CHROMATES BY REVERSE OSMOSIS

BACKGROUND OF THE INVENTION

1. Field of the Invention

The present invention relates to a process for the selective recovery of chromates from wasted industrial process water and the simultaneous reclamation of a substantial portion of the wasted process water wherein the chromates may be recycled.

2. Description of the Prior Art

Industrial operations, such as cooling and condensing in the steel and petroleum industries, require large volumes of process water. The water which takes on heat in the process is usually cooled in a cooling tower. It is known to treat the process water with various chemicals to prevent such problems as scaling, corrosion and the growth of algae and bacteria.

It is also know that evaporation in a cooling tower results in an increasing and eventually undesirable concentration of the dissolved solids in the process water which is recycled after cooling. Thus, a portion of the cooled water is continuously purged or bled off. It is referred to as "blowdown" and must be replaced in the system. Make up water substantially lower in dissolved solids is added to compensate for the volume lost in evaporation, windage and blowdown and to simultaneously lower the overall dissolved solids concentration in the recycled process water. Treatment chemicals may also have to be added to make up for those lost in the blowdown flow. The loss of treatment chemicals may, in a large cooling tower installation, constitute a considerable monetary loss. This factor alone might often make the recovery of one or more of the chemicals for reuse worthwhile economically. In addition, recovery and reclamation of the blowdown water would also provide significant economic benefits.

The blowdown flow is generally discharged to a sewer or otherwise wasted. This flow may, for a 30° F. temperature drop across the tower, constitute 1 percent of the total flow to the cooling tower and can readily reach a volume of 1,000 gallons per minute. Some of the dissolved solids in the blowdown are potentially harmful and their discharge into sewers and waterways has come under strict control.

In particular, the discharge of hexavalent chromium, present in chromate salts widely used as corrosion inhibitors, has been found to produce particularly harmful pollution, and controls on its discharge have become very stringent. Various methods of recovering chromates from blowdown and other industrial effluents are known and include ion exchange and electrodialysis. Though these methods have proved satisfactory for selective removal and recovery of chromates, the processes are quite complex and involve multiple recovery and regeneration steps. Further, the usual presence of large amounts of dissolved solids has made simultaneous reclamation of the water itself impractical or impossible.

SUMMARY OF THE INVENTION

The present invention involves a process by which normally wasted cooling tower blowdown or other process water may be treated to recover the chromates for reuse and to reclaim most of the water for recycling with the chromates. It has been found that treatment of the blowdown containing high concentrations of dichromates and other dissolved solids by subjecting it to reverse osmosis using a loose-type membrane effects a significant softening of the water, as well as a reduction in the concentration of other dissolved solids, while allowing the passage of dichromate ions with the product water. This single step treatment thus provides recovery of chromates, reclamation of water and prevention of chromium pollution of the receiving waters by the wasted portion of the blowdown.

It has been found that chromate salts of monovalent cations are best suited to recovery by this process. Prior to the reverse osmosis step, treatment of the blowdown to increase its acidity may be necessary in order to produce the required dominance of dichromate ions over chromate ions.

DESCRIPTION OF THE PREFERRED EMBODIMENT

There appear to be three specific prerequisites for the successful recovery of chromates from process water in accordance with the process of this invention, namely:

1. the presence of hexavalent chromium in the form of dichromate anions;
2. the copresence of monvalent cations; and
3. the ability of both of the foregoing ions to pass through a loose reverse osmosis membrane.

The presence of dichromate ions is known to be dependent on the pH of the process water. Tests have shown that, if the pH of the solution to be treated is above approximately 7.0, it must be adjusted downwardly to provide the condition necessary for dichromate ion dominance. A pH range of 4.0 to 6.0 was found to provide the best operation in the process of this invention, both to provide high recoveries and to optimize membrane life. The type of acid used to adjust the pH is not believed to be critical and, in actual cooling tower samples tested, the addition of appropriate amounts of sulfuric acid has provided satisfactory results.

It has been found that, of the inorganic chromate salts commonly used as corrosion inhibitors in cooling water systems, the chromate salts of monovalent cations, such as potassium and sodium, are best suited to recovery by the reverse osmosis process of the invention herein. It was found that when the chromate salt of a divalent cation, such as zinc, was utilized as a corrosion inhibitor, the passage of chromate ions through the reverse osmosis membranes was reduced significantly. On the other hand, the recovery of dichromate ions through membrane permeation has been found to be consistent with the presence and availability of monovalent cations.

The loose-type reverse osmosis membrane, found to provide the desired results when used in the process of this invention, may be defined as a membrane capable or rejecting not more than 90 percent total dissolved solids from a solution containing 5,000 parts per million sodium chloride. A cellulose acetate membrane of a type well known and widely used in the art and possessing the required physical characteristics is a Havens Type 310 membrane, which was used in all loose membrane tests, the results of which are set forth below.

The significant characteristic of the loose membrane discovered here is that it will quite readily allow the passage of dichromate ions, but will reject substantially all chromate ions. Correspondingly, the monovalent cations of the dichromate salts will readily pass the loose membrane, as explained above.

In addition, substantial amounts of all other dissolved solids in the process water treated are rejected by and will not pass through a loose membrane. As a result, the product water from the reverse osmosis process will be softened significantly and have a dissolved solids content consisting principally of dichromate anions and monovalent cations.

Product water recovery of 90 percent of the total treated flow is readily attainable. This provides a significant reclamation of process water that is normally wasted, and further provides the ideal medium for carrying the recovered dichromates back into the cooling water system. Makeup water requirements for the system are, of course, reduced significantly.

A tight reverse osmosis membrane may be classified as one capable of rejecting 96 to 98 percent total dissolved solids (TDS) from a solution containing 5,000 parts per million sodium chloride. Comparative results between loose and tight membranes are shown in the tables below and those results show uniformly the unacceptability of a tight membrane in the disclosed recovery process. In all tests the tight membrane was a cellulose acetate Havens Type 510.

The data shown in the tables that follow were obtained in tests using a unit consisting of a bank of series connected modules, each of which modules includes a number of tubular membranes connected in series. The structure and operation of such a unit are well known in the art. The feed water recoveries (product water) obtained in the tests using this unit ranged from 18 percent to 53 percent depending on membrane type, feed water (influent) flow rate and membrane area utilized. Higher feed water recoveries are however, readily attainable by simply adding a similar unit or units in series through which is passed the effluent or flow rejected by the preceding unit.

The feed water recovery generally utilized in actual practice is 90 percent. Product water quality at 90 percent feed water recovery was calculated from the actual data obtained at the lower feed water recoveries through the use of a computer program and the calculated values are shown in table II. The computer program design was based on the material balance of flow as well as the concentration of ions in the influent, product and effluent streams and it provides an accurate prediction of the product water quality at higher feed water recoveries.

Table I shows the results of a test of the effects of pH and membrane type on the recovery of dichromate in accordance with the teaching of this invention. The feed water used in this test was tap water containing approximately 30 milligrams per liter potassium dichromate and having an initial pH of 7.6. For the second test run the pH of the feed water was adjusted to 4.7 by the addition of sulfuric acid. Feed water at both pH levels was subjected to reverse osmosis with both loose and tight membranes.

TABLE I

| Membrane Type | pH | % Dichromate Recovery* |
|---|---|---|
| Loose | 7.6 | 28.0 |
|  | 4.7 | 69.0 |
| Tight | 7.6 | 1.0 |
|  | 4.7 | 7.5 |

*Feed water recovery of 53%.

Table II is based on the results of tests on actual cooling tower blowdown samples. The results indicate that the successful recovery of hexavalent chromium by reverse osmosis may be made simultaneously with recovery of substantially all of the blowdown water. The additional beneficial softening of the recovered water is shown in the rejection of hardness and total dissolved solids (TDS). As shown in the table, one blowdown sample contained potassium dichromate as a corrosion inhibitor and the other sample contained zinc dichromate for the same purpose. The pH of both samples was adjusted to 5.5 and each was subjected to treatment through both a loose and a tight membrane.

TABLE II

| Corrosion Inhibitor | Membrane | % Recovery* Water | % Recovery* Dichromate | % Rejection* Hardness (CaCO$_3$) | TDS |
|---|---|---|---|---|---|
| K$_2$CrO$_7$ | Loose | 90 | 77.0 | 88.4 | 80.0 |
|  | Tight | 90 | 10.0 | 97.7 | 97.7 |
| ZnCrO$_7$ | Loose | 90 | 18.2 | 88.6 | 72.0 |
|  | Tight | 90 | 0.9 | 97.6 | 95.6 |

*Calculated from actual feed water recoveries of 18% to 53%.

The table II results indicate a 77 percent dichromate recovery at 90 percent feed water recovery in accordance with the process of the preferred embodiment. These are considered to be practicable recoveries from an economic standpoint and significant recoveries from the standpoint of pollution abatement and water reclamation.

What is claimed is:

1. A method for treating process water having a high dissolved solids content to make the water recyclable and to retain for reuse in the recyclable fraction a substantial portion of the chromium ions which comprises:
   a. utilizing a chromate salt of a monovalent cation as the chromium source in the process water;
   b. adjusting the pH of the water to be treated to less than 7.0; and
   c. subjecting the water to reverse osmosis utilizing a membrane capable of rejecting not more than 90 percent total dissolved solids from a solution containing 5,000 parts per million sodium chloride.

2. A method for recovering the dichromate salt of a monovalent cation from an aqueous solution having a high concentration of dissolved solids comprising the steps of:
   a. adjusting the pH of the solution to less than 7.0;
   b. subjecting the solution to reverse osmosis utilizing a membrane capable of rejecting not more than 90 percent total dissolved solids from a solution containing 5,000 parts per million sodium chloride; and
   c. retaining the product water from the preceding step.

3. The method in accordance with claim 2 wherein the pH of the solution to be treated is adjusted to a value of from 4.0 to 6.0.

* * * * *